US011192477B2

(12) United States Patent
Michalak et al.

(10) Patent No.: US 11,192,477 B2
(45) Date of Patent: Dec. 7, 2021

(54) SEAT WITH PAD

(71) Applicant: ADIENT ENGINEERING AND IP GMBH, Burscheid (DE)

(72) Inventors: Eric B. Michalak, Canton, MI (US); David B. Bakker, Pinckney, MI (US); Bethany M. Scott, South Lyon, MI (US)

(73) Assignee: Adient Engineering and IP GmbH, Burscheid (DE)

( * ) Notice: Subject to any disclaimer, the term of this patent is extended or adjusted under 35 U.S.C. 154(b) by 0 days.

(21) Appl. No.: 16/644,248

(22) PCT Filed: Sep. 7, 2018

(86) PCT No.: PCT/EP2018/074094
§ 371 (c)(1),
(2) Date: Mar. 4, 2020

(87) PCT Pub. No.: WO2019/048595
PCT Pub. Date: Mar. 14, 2019

(65) Prior Publication Data
US 2020/0353852 A1     Nov. 12, 2020

Related U.S. Application Data

(60) Provisional application No. 62/555,668, filed on Sep. 8, 2017.

(51) Int. Cl.
*B60N 2/58*     (2006.01)
*B60N 2/90*     (2018.01)
*B60N 2/72*     (2006.01)

(52) U.S. Cl.
CPC ............. *B60N 2/5825* (2013.01); *B60N 2/72* (2013.01); *B60N 2/986* (2018.02)

(58) Field of Classification Search
CPC .. B60N 2/5825; B60N 2/5816; B60N 2/5883; B60N 2/6027; A47C 31/023
See application file for complete search history.

(56) References Cited

U.S. PATENT DOCUMENTS 6,886,479 B1 *   5/2005   Hori ..................... B60N 2/5883
                                                               112/470.27
8,360,530 B2     1/2013   Onoda et al.
(Continued)

FOREIGN PATENT DOCUMENTS

DE        4219656 C1 * 12/1992     ........... A47C 31/023
DE        4301834 A1 *   7/1994     ........... B60N 2/5825
(Continued)

OTHER PUBLICATIONS

European Patent Office, International Search Report with Written Opinion, issued in PCT/EP2018/074094, dated Dec. 11, 2018, 9 pages, European Patent Office, Rijswijk, Netherlands.

*Primary Examiner* — Timothy J Brindley
(74) *Attorney, Agent, or Firm* — Marshall & Melhorn, LLC

(57) ABSTRACT

The present disclosure relates to a seat that may have a support structure and a pad having a support wire attachable to the support structure. A retainer may be provided which is fixed at one end through an opening in the support structure and at the opposite end onto the support wire. The retainer may have a mounting member to fix through the opening and a hook to catch the support wire, the mounting member having a use position and a mounting position that is inclined relative to the use position. The mounting member and the hook may be joined by a spacer bar.

11 Claims, 4 Drawing Sheets

(56) References Cited

U.S. PATENT DOCUMENTS

| | | | |
|---|---|---|---|
| 2009/0033131 A1 | 2/2009 | Clauser et al. | |
| 2014/0068900 A1* | 3/2014 | Lovasz | B60N 2/5825 24/543 |
| 2015/0165947 A1* | 6/2015 | Clauser | B60N 2/5833 297/452.18 |
| 2018/0339616 A1* | 11/2018 | Nii | A47C 7/185 |
| 2019/0023162 A1* | 1/2019 | Isobe | B60N 2/5891 |
| 2019/0366892 A1* | 12/2019 | Booth | B60N 2/5825 |

FOREIGN PATENT DOCUMENTS

| | | | | |
|---|---|---|---|---|
| DE | 19616051 A1 | * | 11/1997 | ............ F16B 5/0692 |
| DE | 10116696 C1 | * | 9/2002 | ........... B60N 2/5816 |
| DE | 102008033468 A1 | | 2/2009 | |
| FR | 3054175 A1 | * | 1/2018 | ............. B60N 2/986 |
| WO | WO-2006036006 A1 | * | 4/2006 | ........... B60N 2/5825 |
| WO | WO-2007045334 A2 | * | 4/2007 | ........... B60N 2/5825 |

* cited by examiner

SEAT WITH PAD

BACKGROUND OF THE DISCLOSURE

The present disclosure relates generally to a seat, in particular a vehicle seat with a pad attachable to a support structure.

For attaching the pad to the support structure plastic strips are known which go into the support structure and hold the pad, e.g. soft parts, a trim pad or cushion pad or a foam and trim part, down to the support structure.

A damage or incorrect design position of the soft pad on the support structure may cause that the soft pad can be come off the support structure or a gap arises between the soft pad and the support structure.

SUMMARY OF THE DISCLOSURE

It is an object of the present disclosure to provide a seat having a support structure and a pad which is attachable to the support structure wherein a connection is to be provided for a better hold of the soft pad onto the support structure.

According to the disclosure, the object is solved by the features claimed in claim 1.

According to the disclosure, a seat comprises a support structure and a pad having a support wire attachable to the support structure, wherein a retainer is provided which is fixed at one end through an opening, recess or cut-out in the support structure and at the opposite end onto the support wire. The retainer comprises a mounting member to fix through the opening, recess or cut-out and a hook to catch the support wire, the mounting member having a use position and a mounting position that is inclined relative to the use position, wherein the mounting member and the hook are joined by a spacer bar.

In particular, the support structure and the pad are fixed to each other by a plurality of retainers. The retainers may be individually assembled, e.g. one by one, around the perimeter of the pad. Alternatively, a few numbers of retainers are assembled in the corners of the pad.

The pad has an outer dimension which is smaller than an outer dimension of the support structure. In particular, the pad may be designed as at least one of a side pad, a backrest pad or a seating pad. Furthermore, a plurality of pads may be assembled to one single support structure. For instance, two side pads and one backrest pad can be assembled and fixed to a single backrest support structure by one or more retainers.

The mounting member may be pivoted, e.g. about a pivot axis. In another embodiment, the mounting member may be attached to a flexible strip or band to allow panning between the use position and the mounting position.

The invention allows mounting the pad to the support structure with tolerance compensation between the support structure and the pad. Further the invention allows a correct positioning of the pad to the support structure and to tightly fix the pad to the support structure. In particular, the retainer formed by two fixing ends with a spacer bar between them allows a fixation of the pad to the support structure without a gap.

In particular, the support structure and the pad are to be mounted to each other by the retainer which is designed such that each of the two fixing ends is pivotably arranged onto the spacer bar. The spacer bar is provided between the two fixing ends. In particular, as a first fixing end the mounting member is to be fixed to the support structure and as a second fixing end the hook is to be fixed to the pad.

The spacer bar, the mounting member and the hook may be formed as a one-piece retainer. In particular, the retainer may be formed as a two-component injection molded part. For instance, the mounting member and the hook are arranged to the ends of the spacer bar, e.g. by integral flexible hinges. Alternatively, the spacer bar, the mounting member and the hook are formed as separate parts which are to be pre-assembled together to form the retainer.

According to a further aspect, the hook is pivotably arranged onto the end of the spacer bar directed to the pad. Furthermore, the mounting member is pivotably arranged onto the opposite end of the spacer bar.

Alternatively, the mounting member is perpendicularly fixed to the spacer bar wherein the spacer bar is pivotably arranged to a free end of the hook. Such a hinged arrangement or flexible hinged mechanism of the fixing ends of the retainer allows an easy assembling in tight spaces.

In a possible embodiment, the pad is a soft pad. For example, the pad is a bolster. The pad may be made of foam.

According to a further embodiment, the mounting member is formed as a pivotable base plate. Alternatively or additionally, the mounting member is formed as a pin or a bolt or a screw.

Further, the hook may be formed as J-strip clip or as a clamping clip.

The spacer bar may be formed as a plastic strip. Alternatively, the spacer bar may be formed as a fabric tape. According to a further disclosure, the spacer bar is made of a flexible material. Furthermore, the spacer bar can be provided by a strap or band. The spacer bar can be provided by a conical shaped and/or polygonal or similar shaped spacer bar.

The disclosure further refers to a spacer bar comprising at each end an attachment loop. The attachment loop allows easy assembly and simple insertion of the mounting member to the spacer bar. Further, the spacer bar may comprise a reinforcement member.

BRIEF DESCRIPTION OF THE DRAWINGS

The present disclosure will become more fully understood from the detailed description given herein below and the accompanying drawings which are given by way of illustration only, and thus, are not limitative of the present disclosure, wherein.

Corresponding parts are marked with the same reference symbols in all figures.

DETAILED DESCRIPTION OF PREFERRED EMBODIMENTS

Figure 1:
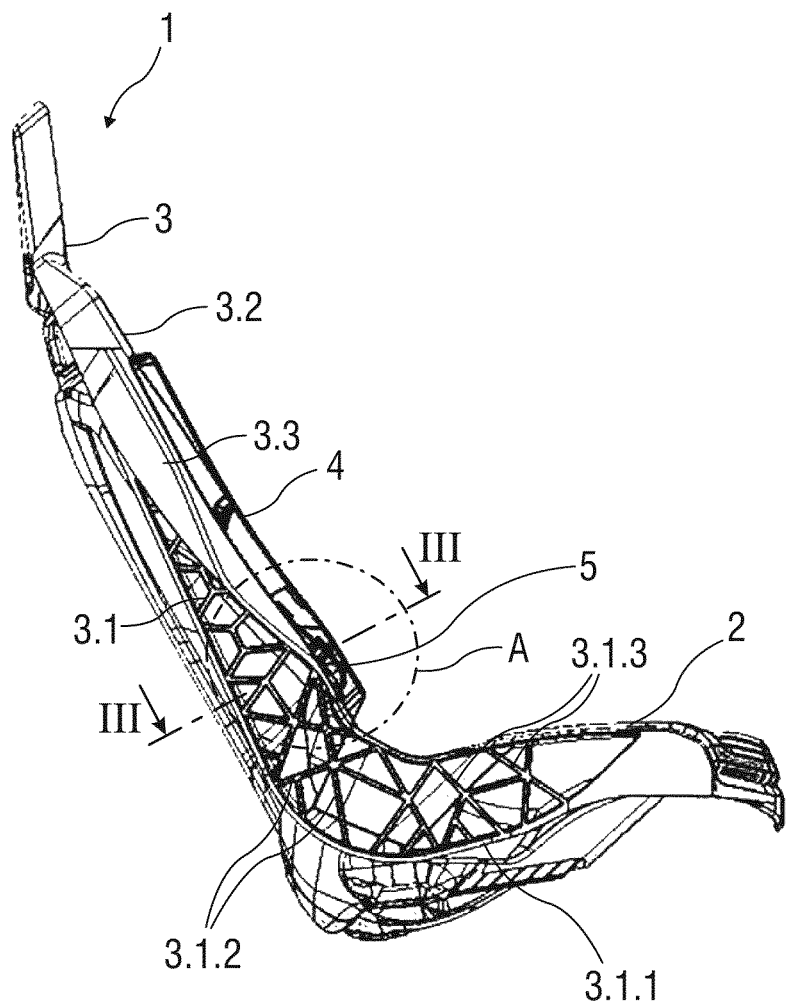
FIG. 1 shows a side view of a possible embodiment of a seat with an attached pad.
Figure 2:
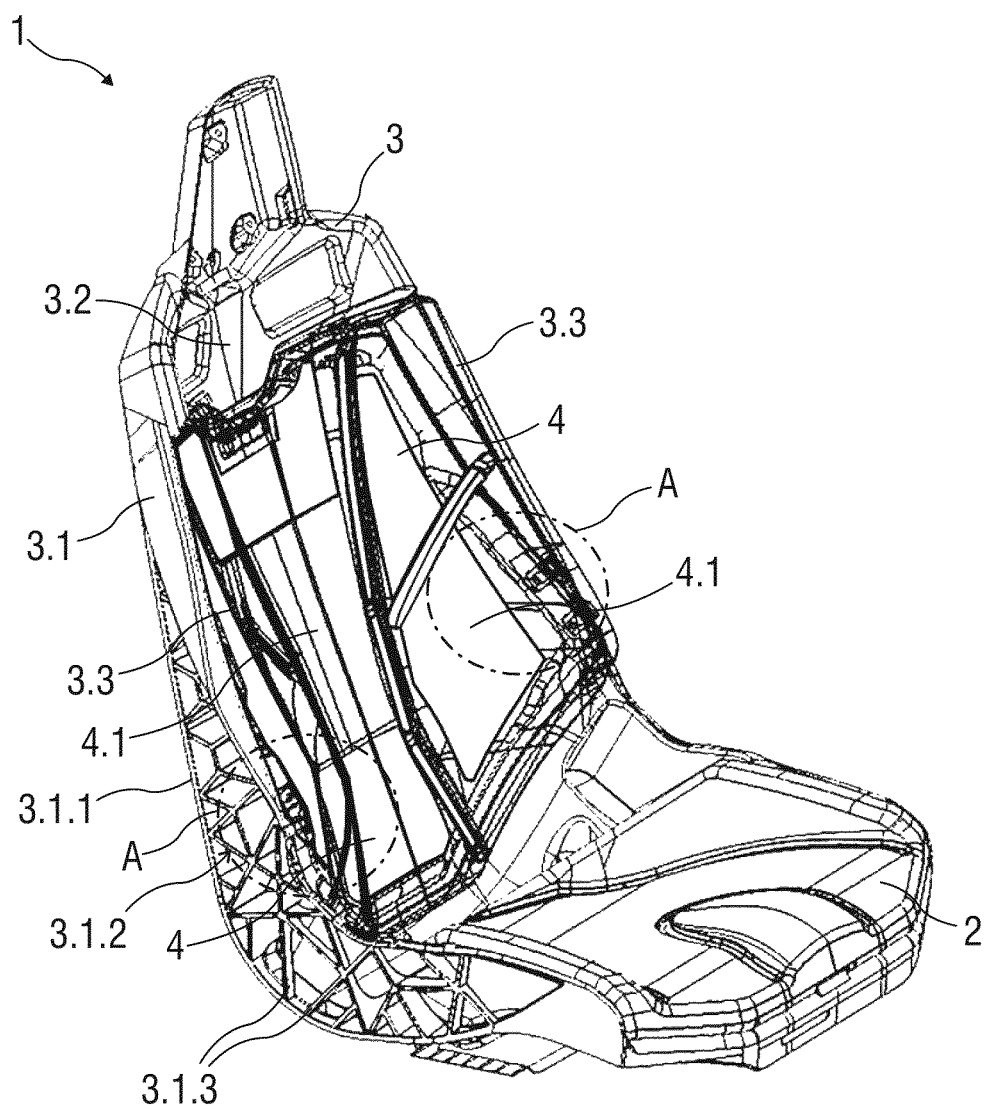
FIG. 2 shows a perspective view of a seat with a pad.

FIGS. 1 and 2 show a side view and a perspective view of a possible embodiment of a seat 1. The seat 1 is for example a vehicle seat.

The seat 1 has seat components with side bolster reinforcement. For example, the seat 1 comprises a generally horizontal seat cushion 2 and a generally upright backrest 3. The seat cushion 2 and the backrest 3 may be adjustable with respect to each other.

The invention is described for the backrest 3 in the following. The invention may be also usable for the seat cushion 2 in a similar manner.

The backrest 3 has a support structure 3.1 with a surface 3.2. The support structure 3.1 is formed e.g. by a frame 3.1.1 with reinforcement structure 3.1.2. For example, the support structure 3.1 may be formed by a support shell with reinforcement ribs 3.1.3. The backrest 3 may have various support structures and configurations. The invention refers to the connection of a pad 4 to the support structure 3.1.

The seating side or surface 3.2 of the backrest 3 is in general planar. The support structure 3.1 has a pair of lateral side edges 3.3.

The pad 4, described below in more detail, is raised from the generally planar surface 3.2 at least along the lateral side edges 3.3 forming side bolsters 4.1 at least alongside the surface 3.2. The side bolsters 4.1 provides a desired snug feeling of the seat 1.

The pad 4 may be formed as a mate. Alternatively, the pad 4 may be formed by separate lateral soft parts. In a possible embodiment, the pad 4 is a soft pad. The pad 4 may be made of foam. The pad 4 has an outer dimension which is smaller than an outer dimension of the support structure 3.1. In particular, the pad 4 may be designed as at least one of a side pad, a backrest pad or a seating pad. Furthermore, a plurality of pads may be assembled to the one-piece support structure 3.1. For instance, two side pads and one backrest pad can be assembled and fixed to the one-piece backrest support structure 3.1 by one or more retainers 5.

The pad 4 is attachable to the support structure 3.1. The pad 4 is placed over the support structure 3.1 or frame or shell. Once the pad 4 is applied to the support structure 3.1, the seat component is covered with a seat cover material such as fabric, leather or vinyl in a conventional manner.

Figure 3:
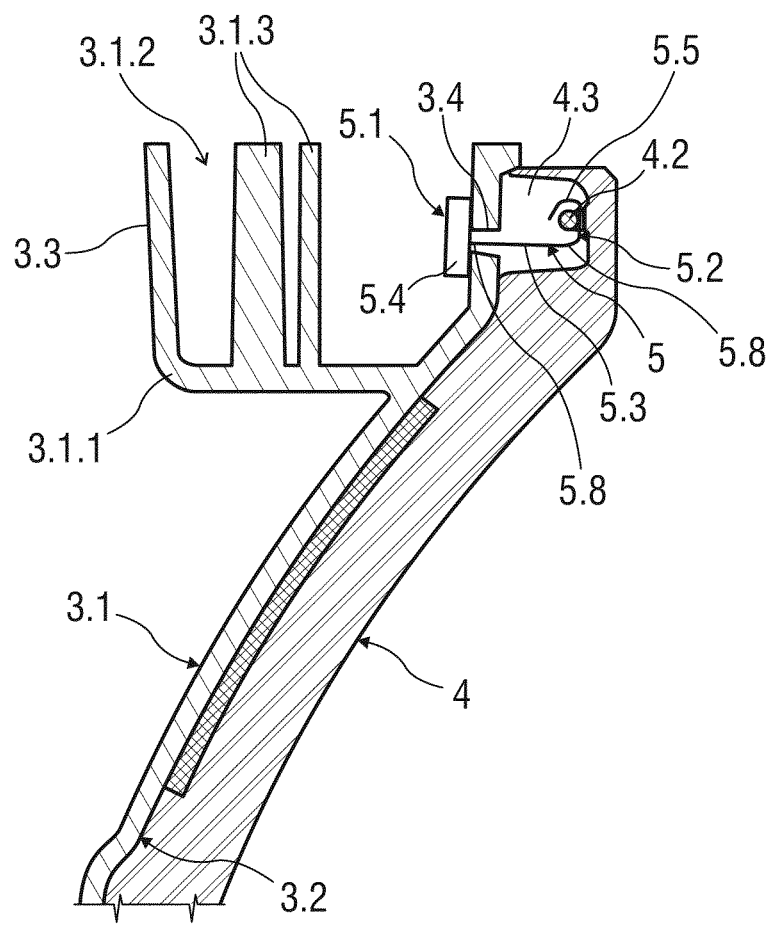
FIG. 3 shows a cross section of a seat with a pad in a connecting area.

FIG. 3 shows a cross section of the seat 1 with the attached pad 4 in a connecting area A (shown in FIGS. 1 and 2).

The pad 4 further has a support wire 4.2. The support wire 4.2 serves for attaching the pad 4 to the support structure 3.1. The support wire 4.2 may be formed as a tube or as cable tie. In particular, the support wire 4.2 may be formed by a single piece cable or wire. The pad 4 comprises for example a groove 4.3. In particular, the groove 4.3 may be formed as a circumferential groove in which a single support wire 4.2 is arranged.

Furthermore, the support structure 3.1 comprises a recess 3.4. The recess 3.4 is aligned with the groove 4.3 in the pad 4. In particular, during assembling the support structure 3.1 and the pad 4 are to be positioned to each other such that the recess 3.4 comes into an alignment with the groove 4.3.

A retainer 5 is provided to align the support structure 3.1, in particular the recess 3.4 with the pad 4, in particular with the groove 4.3 in the pad 4.

In particular, the support structure 3.1 and the pad 4 are fixed to each other by a plurality of retainers 5. The retainers 5 may be individually assembled, e.g. one by one, around the perimeter of the pad 4. Alternatively, a few numbers of retainers 5 are assembled in the corners of the pad 4.

The retainer 5 is fixed at one end 5.1 through the recess 3.4 or an opening in the support structure 3.1. At the opposite end 5.2, the retainer 5 is fixed onto the support wire 4.2. The both ends 5.1, 5.2 are joined by a spacer bar 5.3.

The retainer 5 serves for a proper location of the pad 4 on the support structure 3.1. In particular, the retainer 5 allows mounting the pad 4 to the support structure 3.1 with tolerance compensation. The pad 4 is tightly fixed to the support structure 3.1, in particular without a gap, by the retainer 5.

In particular, the support structure 3.1 and the pad 4 are to be mounted to each other by the retainer 5 which is designed such that each of the two fixing ends 5.1, 5.2 are pivotably arranged onto the spacer bar 5.3. The spacer bar 5.3 is provided between the two fixing ends 5.1 and 5.2. In particular, as a first fixing end 5.1 a mounting member 5.4 is to be fixed to the support structure 3.1 and as a second fixing (opposite) end 5.2 a hook 5.5 is to be fixed to the pad 4, in particular to the wire 4.2.

The spacer bar 5.3, the mounting member 5.4 and the hook 5.5 may be formed as a one-piece retainer 5. In particular, the retainer 5 may be formed as a two-component injection molded part. For instance, the mounting member 5.4 and the hook 5.5 are arranged to the ends 5.1, 5.2 of the spacer bar 5.3, e.g. by hinges 5.8, for instance by integral flexible hinges (see FIGS. 4 and 5).

Figure 5:
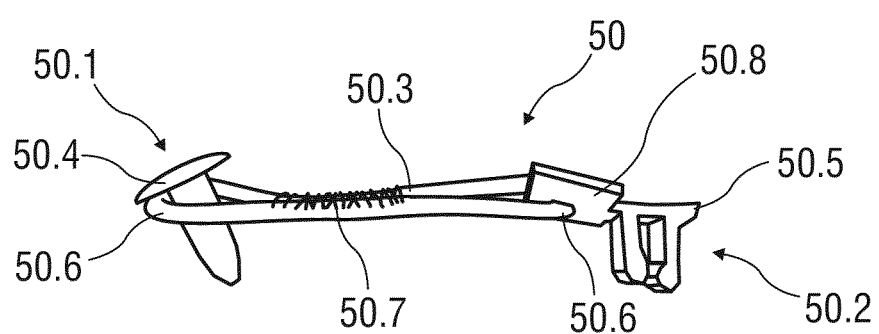
FIG. 5 shows an alternative embodiment of a retainer.

Alternatively, a spacer bar 50.3, a mounting member 50.4 and a hook 50.5 are formed as separate parts which are to be pre-assembled together to form a multi-part retainer 50 shown in FIG. 5, wherein the mounting member 50.4 and the hook 50.5 are flexibly arranged to the ends 50.1, 50.2 of the spacer bar 50.3 by hinges 50.8.

Figure 4:
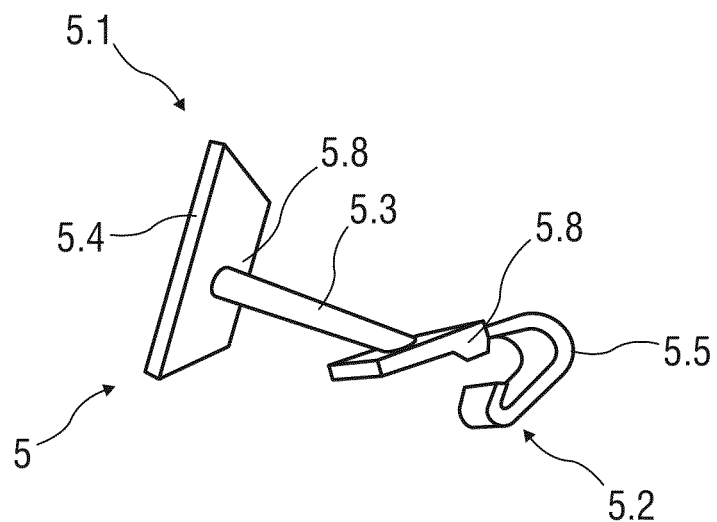
FIG. 4 shows a possible embodiment of a retainer.

FIG. 4 shows a possible embodiment of the retainer 5 in more detail.

The retainer 5 comprises at one of the ends 5.1 the pivotable mounting member 5.4 to fix it through the recess 3.4 in the support structure 3.1.

On the opposite side 5.2, the retainer 5 comprises the hook 5.5 to catch the support wire 4.2 in the pad 4.

The mounting member 5.4 and the hook 5.5 are joined by the spacer bar 5.3. The mounting member 5.4 is flexibly fixed or hinged to the spacer bar 5.3 in a conventional manner, e.g. by a mechanical connection, for example a joint connection or form fit connection or force fit connection having a hinged mechanism. E.g. the mounting member 5.4 may be fixed to the spacer bar 5.3 by an integral flexible hinge.

Further, the mounting member 5.4 may be perpendicularly fixed to the spacer bar 5.3, wherein the spacer bar 5.3 is pivotably arranged to a free end of the hook 5.5.

The hook 5.5 is fixed to the spacer bar 5.3 in a conventional manner, e.g. by a mechanical connection or an adhesive connection. In particular, the hook 5.5 may be pivotably arranged onto the end of the spacer bar 5.3 directed to the pad 4. For instance, a hinge 5.8 is arranged between the hook 5.5 and the respective end of the spacer bar 5.3.

The hook 5.5 may be formed as J-strip clip or as a clamping clip. The hook 5.5 is resilient to snap over the support wire 4.2.

The mounting member 5.4 is formed as a pivotable base plate. The mounting member 5.4 may be inserted into the recess 3.4 to secure the pad 4 to the support structure 3.1.

The spacer bar 5.3 is made of a flexible material. In particular, the spacer bar 5.3 is formed by a tape, e.g. a fabric tape. Furthermore, the spacer bar 5.3 can be provided by a strap or band. Additionally, the spacer bar 5.3 can be provided by a conical shaped and/or polygonal or similar shaped spacer bar.

Such a hinged arrangement or flexible hinged mechanism of the fixing ends 5.1, 5.2 of the retainer 5 onto the spacer bar 5.3 allows an easy assembling in tight spaces.

FIG. 5 shows an alternative embodiment of a retainer 50.

The mounting member 50.4 is formed as a pin or a bolt or a screw for a form-fit connection with the support structure 3.1. Instead of the hook 5.5 a fastening strap 50.5 may be provided to catch the support wire 4.2.

The spacer bar 50.3 may be formed as a plastic strip or band. The plastic strip or band may be woven.

The spacer bar 50.3 comprises at each end an attachment loop 50.6. Further, the spacer bar 50.3 can be reinforced, e.g. by a reinforcement member 50.7, for example a second strip.

Further, a hinge 50.8 is arranged between the hook 50.5 and the respective end of the spacer bar 50.3.

LIST OF REFERENCES 1 seat
2 cushion
3 backrest
3.1 support structure
3.1.1 frame
3.1.2 reinforcement structure
3.1.3 ribs
3.2 surface
3.3 edge
3.4 recess
4 pad
4.1 bolster
4.2 support wire
4.3 groove
5, 50 retainer
5.1, 50.1 end
5.2, 50.2 opposite end
5.3, 50.3 spacer bar
5.4, 50.4 mounting member
5.5, 50.5 hook
50.6 loop
50.7 reinforcement member
5.8, 50.8 hinges
A area

The invention claimed is:

1. A seat comprising:
a support structure and
a pad having a support wire attachable to the support structure, wherein
a retainer is provided which is fixed at one end through an opening in the support structure and at the opposite end onto the support wire,
the retainer comprises a mounting member to fix through the opening and a hook to catch the support wire, the mounting member having a use position and a mounting position that is inclined relative to the use position, and
the mounting member and the hook are pivotally joined to a spacer bar, wherein said hook has a closed upper portion and an open lower portion wider than said upper portion, said lower portion having an inwardly turned finger adapted to secure said support wire.

2. The seat according to claim 1, wherein the pad is a soft pad.

3. The seat according to claim 1, wherein the pad is a bolster.

4. The seat according to claim 1, wherein the pad is made of a foam part.

5. The seat according to claim 1, wherein the mounting member is formed as a pin or a bolt or a screw.

6. The seat according to claim 1, wherein the hook is formed as J-strip clip.

7. The seat according to claim 1, wherein the spacer bar is formed as plastic strip.

8. A seat comprising:
a support structure and
a pad having a support wire attachable to the support structure, wherein
a retainer is provided which is fixed at one end through an opening in the support structure and at the opposite end onto the support wire,
the retainer comprises a mounting member to fix through the opening and a hook to catch the support wire, the mounting member having a use position and a mounting position that is inclined relative to the use position, and the mounting member and the hook are joined by a spacer bar, wherein the spacer bar is formed as fabric tape.

9. A seat comprising:
a support structure and
a pad having a support wire attachable to the support structure, wherein
a retainer is provided which is fixed at one end through an opening in the support structure and at the opposite end onto the support wire,
the retainer comprises a mounting member to fix through the opening and a hook to catch the support wire, the mounting member having a use position and a mounting position that is inclined relative to the use position, and the mounting member and the hook are joined by a spacer, wherein the spacer bar is made of a flexible material.

10. The seat according to claim 1, wherein the spacer bar comprises at each end an attachment loop.

11. The seat according to claim 1, wherein the spacer bar comprises a reinforcement member.

* * * * *